Aug. 31, 1948.     B. A. DE A. CAVALCANTI     2,448,484
ALTIMETRIC-STEREO-CORRECTOR

Filed Dec. 27, 1943     2 Sheets-Sheet 1

BenjaminArcoverdeDeAlbuquerqueCavalcanti
INVENTOR

BY

ATTORNEY

Aug. 31, 1948.                B. A. DE A. CAVALCANTI                 2,448,484
                              ALTIMETRIC-STEREO-CORRECTOR
Filed Dec. 27, 1943                                           2 Sheets-Sheet 2

Benjamin Arcoverde De Albuquerque Cavalcanti
INVENTOR
BY
ATTORNEY.

Patented Aug. 31, 1948

2,448,484

UNITED STATES PATENT OFFICE 2,448,484

ALTIMETRIC-STEREO-CORRECTOR

Benjamin Arcoverde de Albuquerque Cavalcanti,
Rio de Janeiro, Brazil

Application December 27, 1943, Serial No. 515,753
In Brazil March 12, 1943

16 Claims. (Cl. 33—20)

1

The altimetric-stereo-corrector is an apparatus which complements the small stereoscopic plotting instruments that measure the differences of elevation in function of the differences of the stereoscopic parallax. Among these plotting instruments I may mention: The Fairchild stereocomparagraph, Abram's contour finder, the stereograph of the Brazilian Military Geographical Service, etc.

When the photographs of the stereoscopic pair used in these instruments are not exactly vertical and not taken at the same flight height—as generally is the case—the differences of elevation show errors which can reach very high values, of from 300 to 600 feet.

Because of such errors, if the photographed ground is flat, the corresponding stereoscopic model, viewed and measured in the instrument, will show a curved surface and will be tilted in relation to the horizon.

If the terrain is mountainous, all will be as if the ground adjusted itself over the curved surface, corresponding to an imaginary plain which passed through any datum point of the terrain. In this way, the elevation of any point of the terrain equals the elevation furnished by the stereoscopic instrument, less the height that corresponds to the curved surface. This curved surface, therefore, can be designated as tilt surface datum. This surface datum has two characteristic properties which permit its easy geometrical representation, namely:

1. The cuts made on the tilt surface datum by vertical planes, perpendicular to the line of principal points of the photographs, are straight lines.

2. The cuts made in that surface by vertical planes, parallel to the line of principal points are curves of the second degree, approaching circumference arcs.

If I take eight points of known elevation, four above and four below the overlapping area, conveniently spaced from one another and so placed that each upper point should have its corresponding lower one, approximately in the same perpendicular to the line of principal points of the photographs, I can determine the relative height of the surface datum in the verticals of those eight points by the differences between the known elevations of the terrain and those measured in the instrument.

Applying the first property I can draw the four profiles of the surface, perpendicular to the line of principal points, between each upper point and the corresponding lower one. With the second property, I draw the profiles perpendicular to the four profiles already drawn, in the required number.

By the convenient combination of the profiles I can determine the height of any point of that surface; this makes it possible to be defined, with relative accuracy, by its contour lines. The whole of the contour lines is designated as correction graph.

There are also other causes which control the deformation of the surface datum. The cause most frequently found is that due to the distortion of the photographic image, originated by the distortion of the optical system of the camera. In most cameras this distortion has a considerable effect. The resulting deformation is not subject to fixed rules, but depends on the variation of the focal length of the camera, on the flight height and on the overlap of the photographs. It is, therefore, generally constant for each aerial survey. The surface which corresponds to it may be called distortion surface datum.

It is evident that in order to obtain the true contour lines of the correction graph it is necessary to combine those due to tilt and differences in flight height with those resulting from the other causes. Also, to obtain the first ones it is necessary to eliminate from the elevations measured in the instrument the influence of the second ones, so that I may find only the errors originated by the tilt and by the differences in flight height. After having been drawn, the first are corrected from the influence of the second ones.

The drawing of the correction graph almost always requires too much time, and sometimes the combination of the two kinds of contour lines is complicated and demands care to prevent mistakes.

In the operation, to get the true elevation which corresponds to each height measured in the instrument, I deduce from the latter the relative height of the resultant surface datum in this point, given by the correction graph.

In this way the work is slow, requiring a great deal of care. To accompany a contour line on the spatial model it is necessary to correct continually the height shown in the instrument, and even this is possible only when the deformation of the surface datum is not too pronounced.

Thus, the small stereoscopic plotting instruments are rather apparatuses for measuring isolated elevations, for the subsequent interpolation of the contour lines by normal topographic drafting processes.

The need for making the work with those instruments simple and rapid led the inventor to search for a means to reproduce the forms of the surface data and automatically effect the corresponding corrections. For this purpose the altimetric-stereo-corrector was created. It is an exceedingly simplified apparatus which, connected to any of those stereoscopic plotting instruments, entirely accomplishes the desired end. With its help the contour lines are continually drawn as in the large stereoscopic plotting instruments.

The invention is illustratively exemplified in the accompanying drawings in which.

The altimetric-stereo-corrector

Figure 1:
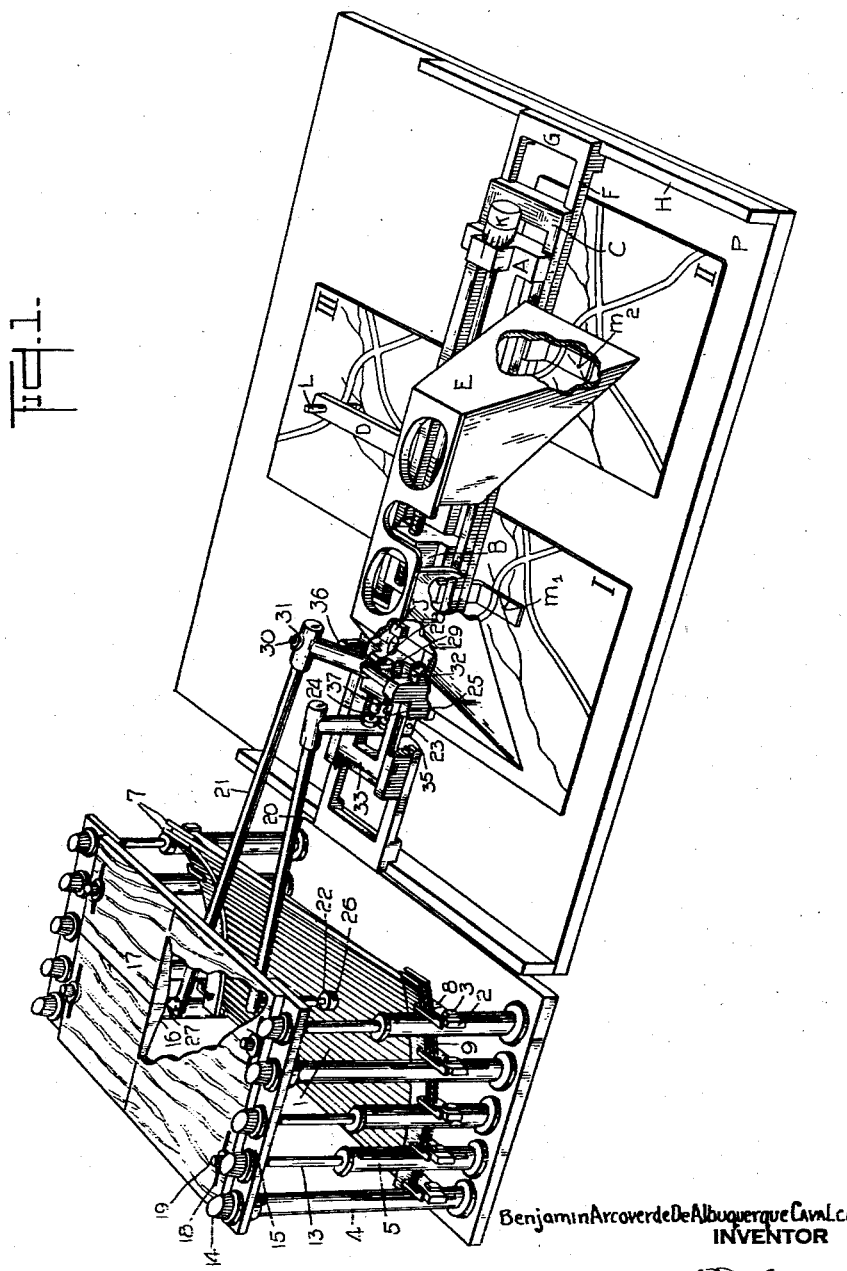
Fig. 1 is a perspective view of an altimetric-stereo-corrector according to the invention shown attached to a small stereoscopic plotting instrument of known construction.

Fig. 1 shows the altimetric-stereo-corrector attached to an schematic representation of the small stereoscopic plotting instruments. The parts indicated by numbers, constitute the altimetric-stereo-corrector, and those indicated by letters, are the schematic representation of the plotting instrument.

These plotting instruments generally have a carriage A, to which is attached a small colored index mark $m_2$, engraved on glass, and a drawing arm D having a pencil L at one end.

Resting longitudinally on the carriage A there is a slide B to which is attached another index mark $m_1$, exactly like the first one. To this carriage is also attached a stereoscope E.

Thus, the displacements of the slide B in relation to the carriage A, the distance between the index marks varying according to the difference in stereoscopic depth, can be realized and measured by means of a micrometer K.

The carriage A in these small apparatuses is directly connected with an alignment mechanism FGH which assures to it parallel movements in all directions, so as to permit that the index marks $m_1$ and $m_2$ run over their corresponding photographs I and II, which in the figure are adjusted and fixed on the base board P.

In the adaptation of the instrument to receive the altimetric-stereo-corrector, however, it was provided with an additional carriage C, shown in Fig. 1, intermediate between the carriage A which slides resting on it and the alignment mechanism FGH; to the second carriage C were transferred the index mark $m_2$, the drawing arm D with the pencil L and the stereoscope E as shows the mentioned figure.

This permits the variation of the distance between the index marks $m_1$ and $m_2$ either by action of the micrometer K or by the sliding of the carriage A.

When viewed in the stereoscope, the index marks $m_1$ and $m_2$, owing to a physiological sensation, become a floating mark. By the variation of the distance between the index marks, that is, by the variation of the stereoscopic parallax, the floating mark will rise or lower in space, and whenever the index marks coincide, over their respective photographs, with images of the same object in the terrain, the floating mark will appear in contact with the spatial model, resting over that object.

The index mark $m_2$ and the pencil L are connected with each other through the carriage C and the drawing arm D; therefore, all movements of the index mark $m_2$ running over the details of the photograph II are reproduced on the drawing sheet III. It is, thus, the drawing index mark.

The index mark $m_1$ is movable in relation to the other one, displacing itself longitudinally when the carriage A moves, or the slide B, or both. It is, therefore, the only index mark that causes the up and down displacement of the floating mark, and it may, therefore, be designated as elevation index mark.

When the floating mark is resting over an object of the spatial model and is made to rest over another of different stereoscopic depth, the elevation index mark $m_1$ undergoes a longitudinal displacement in relation to the drawing index mark $m_2$; this displacement can be decomposed into two others: One which corresponds to the differences in elevation between these two points, and another which results from the causes of errors already mentioned.

The intermediate carriage C permits that the first displacement be introduced by the micrometer K, which shows the true difference in elevation, and that the second one be obtained by the sliding of the carriage A driven by the altimetric-stereo-corrector, acting against the anvil J of the carriage A.

In this way the altimetric-stereo-corrector automatically makes all displacements which correspond to the errors, leaving the micrometer K to make the displacements which correspond to the true differences in elevation.

The altimetric-stereo-corrector is constituted of two distinct units: one formed by the two surface data and the other by the mechanism that transmits the corrections made by those surfaces.

Of the surface data, that of the tilt presents, for each stereoscopic pair, a different form; therefore, the device that reproduces it must adjust itself to each case.

This does not happen as to the distortion surface datum, which keeps the same form for all the stereoscopic pairs made with the same camera; only its vertical scale varies, according to the flight height. Thus, only one indeformable model is good for all the surveys made with the same camera.

The differences of stereoscopic parallax which correspond to the small differences of elevation are, in fact, very small. For instance, for stereoscopic pairs made with a K–3B, 7 by 9 inch, 8¼ inch focal length camera, with a 60% overlap at the flight height of 14,000 feet, the difference of stereoscopic parallax corresponding to 10 feet is 0.06 mm. As will be seen, the reproduction of the surface data on a natural scale for registering differences of elevation of 5 to 10 feet must be sensitive to a few hundredths of one millimeter.

In practice this is not possible with small-cost instruments. Differences of 0.1 to 0.2 mm. are inevitable in the representation.

This required the adoption of a convenient scale for the heights of each one of those surfaces, enlarging the heights 10 to 20 times, so that the differences mentioned should not correspond to appreciable values. In consequence, the transmitting mechanism must cancel such enlargements.

Tilt surface datum

The representation of the tilt surface datum can be obtained by adjusting a mat 1—Figs. 1 and 2—of adequate construction, to a frame made up of a series of bars 2 resting at their ends on forks 3 of an elevating mechanism which operates on columns 4 and 5, attached to a table 6.

The planes in which the bars 2 move are parallel to one another, and the bars define the cuts of the surface datum which are perpendicular to the line of principal points, which, according to the first of the properties of that surface, are straight lines.

Ribbons of flexible thin sheets 7 are adjusted crosswise near the ends of the bars 2, taking the curvature of the corresponding cuts of the surface datum, which, according to its second property, and because of the vertical scale, shows the form of harmonious curves.

For this purpose, small claws 8 of constant pressure are installed at the ends of the bars, to adjust the flexible ribbons to the bars, to permit the lateral adjusting movements of the ribbons. At each end there are two of these flexible ribbons, superimposed so as to form a sheath and guide for the ends of the mat 1. The mat can be made of rigid round rods of identical diameter, or of narrow ribbons of flexible sheets; these elements are juxtaposed and follow the direction of the bars 2.

The attachment of these elements should be made so as to leave a small gap between one another, especially near their ends, to avoid their being curved in the direction of the bars 2 in certain forms of the surface datum. The use of rods is the best and most practical solution for its construction.

The mat is installed on the frame, as already explained, having its ends between the flexible ribbons 7. It takes, therefore, at the ends, the convenient curvature imposed by those flexible ribbons, all its lines parallel to the bars 2 being straight.

As to the number of these bars, five are enough.

Figure 2:
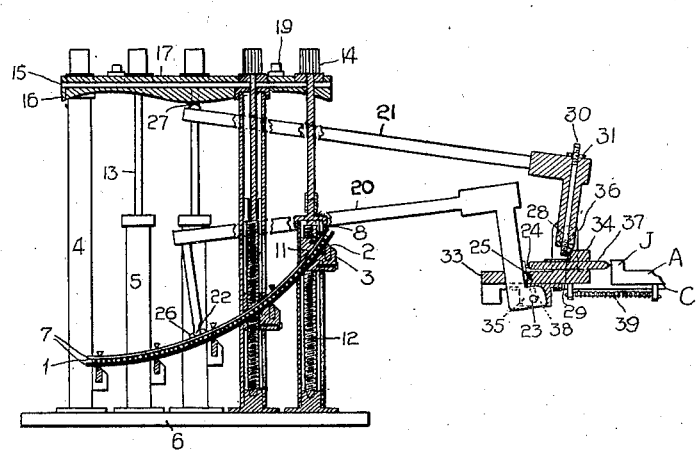
Fig. 2 is a side elevation, partly in section, of the altimetric-stereo-corrector according to Fig. 1, with those parts which project into the plotting instrument being broken away.

The elevating mechanism of each one of the bars 2 is constituted of a nut 11—Fig. 2—a fork 3 fixed on it which sliding through a longitudinal slot of its corresponding column 4 or 5, prevents the rotation of the nut, and an elevating screw 12 which crosses the nut and, because the nut cannot rotate, transmits to the nut rising and lowering movements. All the elevating screws 12 are connected by rods 13 to knurled knobs 14, all at the same level, which control the movements of the screws.

The elevating mechanisms do not require graduations because their heights are introduced indirectly, as will be shown in the part referring to the operation. The higher columns 4 sustain the platforms 15 which serve as a support for the model of the distortion surface datum.

Distortion surface datum

The distortion surface datum 16 can be modeled in any indeformable material which would resist the pressure of the point 27 of the transmitting mechanism. The model obtained for it is fixed to a wooden or metal sheet 17 which rests on the platforms 15, the model being turned down. The sheet has four slots which permit, during the adjustment of the instrument for operation, the sliding of the model guided by the four screws 19 of the platforms. These screws have nuts which fix the model in its correct position.

The transmitting mechanism

The transmitting mechanism must have devices which should satisfy the following requirements:

1. Transform the enlarged differences of height of the surface datum into longitudinal motions, in the direction of the stereoscopic parallax, at the same time reducing them to the true length.

2. Add, according to their signs, the motions which correspond to each one of the surface data, transmitting their resultant to the elevation index mark of the stereoscopic plotting instrument.

To fulfill the first of these conditions, rightangled levers 20 and 21—Figs. 1 and 2—are used which, on their turn, constitute the reducing devices to the true length. These levers are designated, respectively, as tilt lever 20 and distortion lever 21. The form of the first one, which is that of an elongated portal frame, permits that its contact end 22 slide freely over the mat 1, whatever may be the height of the edge of the mat beside the plotting instrument—Fig. 2. In order to insure a smooth sliding of the contact end 22 over the bars of the mat, a small slide plate 26 has been inserted between them; the part of the slide plate which is in contact with the mat is convex and slightly spherical.

It is convenient that the imaginary lines 23—22 and 23—24, which connect its fulcrum to the contact ends should form a true right angle. Even when this requisite is disregarded, the instrument serves its purpose, there being a compensation of the surface datum.

The reduction scale is given by the relation between the above-mentioned lines: 23—24/23—22.

It is possible to vary this scale by means of other contact ends 25 of the rising arm of the lever and other corresponding positions 38 of its fulcrum.

The distortion lever 21 has the form of an L. In order to facilitate the construction, the imaginary lines 28—27 and 28—29, which connect its fulcrum to the contact ends, need not be exactly perpendicular to each other, as shown in Figs. 1 and 2; this will not cause errors, as the corrections of distortion are small.

As the distortion surface datum has a fixed form for each aerial survey, it is necessary to determine the corresponding reduction scale, which, as has already been said, depends on the flight height. This scale is introduced in the distortion lever by the variations of the distance 28—29. For this purpose, the rod 30, in which is fixed the point 29, moves longitudinally inside the rising arm of the lever. The main axles of these levers 20 and 21 are invariably attached to the latter.

To satisfy the second requisite, the solution adopted by the inventor was to transmit one of the corrections to the fulcrum of the lever of the other correction, which causes the latter to transmit the resultant of the two corrections. For this purpose a small slide 33 has been installed resting on the intermediate carriage C; the slide runs longitudinally on the carriage, and has on its upper part an anvil 34 against which rests the end 29 of the distortion lever, and on the lower part two ears 35 where is attached the axle which serves as a fulcrum to the tilt lever 20. The distortion lever 21 rests on ears 36 directly attached to the carriage C.

In this way, the elevation index mark $m_1$ receives through the transmitting rod 37 the tiltcorrecting movements transmitted by the tilt lever, added to the displacements of the fulcrum of that same lever, which are the distortion-correcting movements.

Helical springs 39, connecting the carriage C to the carriage A, maintain the adjustment of the whole unit (Fig. 2). By their action, the contact ends 22 and 27 of the tilt and distortion levers stay in contact with their respective surfaces.

Operation

At the same time that in the stereoscopic plotting instrument the floating mark runs through the spatial model of the photographed ground, the contact ends of the levers of the transmitting mechanism run through the corresponding points of the surface data.

The up movements of those ends originated by the differences in height of the surfaces are reduced in proportion to the arms of their respective levers and, also by them, transformed into longitudinal motions.

The movements originated by the distortion levers are transmitted to the axle of the tilt lever. The movements originated by the tilt lever are transmitted directly to the transmitting rod 37. Thus, this rod receives the tilt movements transmitted by the tilt lever added to the displacements of the fulcrum of that same lever, which are the movements of the distortion.

The transmitting rod 37, resting on the anvil J of the carriage A, transmits through this carriage the resultant of the movements to the elevation index mark $m_1$. This causes the floating mark to reproduce automatically in the space the surface datum which corresponds to these errors, over which the true relief of the ground is adjusted. Thus, all the height displacements of this floating mark, caused by the micrometer K, correspond only to that relief, and are thus measured by the micrometer.

Preparing the apparatus for operation

Once the photographs are properly placed in the plotting instrument, the altimetric-stereo-corrector is adjusted so that the contact end 27 of the distortion lever should touch the center of the respective surface datum, when we view the middle of the line of the principal points of the stereoscopic pair. Small longitudinal displacements of the distortion model can be made by loosening the attaching screws 19.

We then find the points of known elevation, which, to define the tilt surface datum, must be at least eight. We set the micrometer to the elevation of one of the points of known elevation and, by means of the plotting instrument, we make the floating mark rest on that point. We then set the micrometer to the elevation of another known point. When viewing this new point, the floating mark will stay in the space or on the ground. We make the floating mark rest on the point by varying the height of the tilt surface datum, acting through the knurled knobs 14 next to the end 22 of the tilt lever. The same procedure is repeated with the other points of known elevation, and we obtain a preliminary approach of the tilt surface.

The observations of the points of known elevations are repeated with the same operations until the floating mark rests on each one of these points only with the introduction of their respective readings in the micrometer K. If these points have their right elevation, the flexible thin sheets 7 will take a harmonious form. If not, one of the elevations is wrong, and can be identified at once.

Thus, without making a single measurement directly in the altimetric-stereo-corrector, and without calculations, we have the tilt surface datum. As to the distortion surface datum, it is fixed, as indicated above.

It is interesting to point out that with the altimetric-stereo-corrector, the eight points of known elevation, required for the plotting of each stereoscopic pair, need not have an arrangement so rigid as that described in column 1; this should greatly facilitate the field work.

Plotting

The plotting is performed as in the large apparatuses built for this purpose. To draw a contour line, it is enough to introduce in the micrometer the reading which corresponds to its elevation and follow the spatial model of the terrain, keeping the floating mark always in contact with it.

Simplified construction

Figure 3:
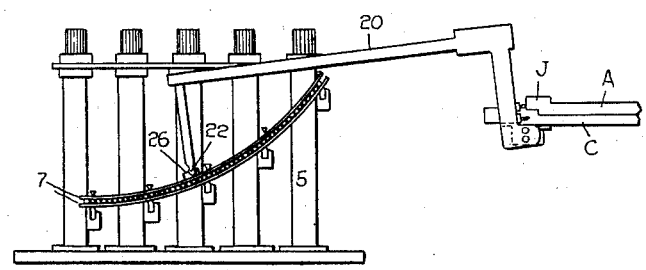
Fig. 3 is a side elevation similar to that of Fig. 2 of a modified altimetric-stereo-corrector.

When the aerial survey is made with a photogrammetric camera provided with an optical system practically free from distortion, the altimetric-stereo-corrector of the plotting instrument need not have the part for the corresponding correction. It should have only the tilt surface datum, and its transmitting mechanism should have only the tilt lever 20 resting on ears of the intermediate carriage C and transmitting the corrections directly to the carriage A, as shown on Fig. 3.

Similar instruments

No apparatus similar to the altimetric-stereo-corrector is mentioned in the specialized technical literature.

Altimetric-stereo-corrector scope

The altimetric-stereo-corrector is an apparatus which complements the small stereoscopic plotting instruments which measure elevations in function of the variations of the stereoscopic parallax, requiring, however, a convenient adaptation of the plotting instruments to receive it. It automatically corrects the errors of elevation which result from the small tilt of the photographs of the stereoscopic pairs plotted in those instruments, from the differences in the flight height in which the photographs were taken, and from the other determinable causes of errors, of which the chief one is the optical distortion.

Having now particularly described and ascertained the nature of my said invention and in what manner the same is to be performed, I declare that what I claim is:

1. In combination with a stereoscopic altitude plotting instrument for pairs of aerial photographs, said instrument including a carriage provided with a marker and displaceable along the stereoscopic parallax and at right angles thereto to determine on one photograph of a selected stereoscopic pair the point to be plotted, an element displaceable relative to said determined point along the stereoscopic parallax for altitude plotting purposes, and a measuring device for measuring the displacement of said element to permit plotting of the altitude at the selected point, an altimetric-stereo-corrector comprising a cam element having a cam surface curved and inclined in function of the curvatures and inclinations of the tilt surface datum for the stereoscopic pair of photographs to be plotted, a lever mounted on said carriage for pivotal movement relative thereto and including a follower in contact with said cam surface for displacement over the latter in function of the displacement of said carriage along the stereoscopic parallax, and means to displace said element and measuring device in unison relative to said determined point along the stereoscopic parallax in function of the pivotal movements of said lever.

2. In combination, as claimed in claim 1, in which said lever includes an arm having the shape of an inverted elongated U the two legs of which are shorter than its base, said arm being fulcrumed for pivotal movement near the end of one of said legs and carrying said cam follower at the end of its other leg to permit of the follower remaining in contact with the cam surface regardless of the height of said cam surface relative to said carriage of said plotting instrument.

3. A combination, as claimed in claim 1, in which said follower is formed as a small convex slide plate on one end of said lever.

4. A combination, as claimed in claim 1, in which said tilt surface datum cam element is adjustable in curvature along the stereoscopic parallax and in slope at right angles thereto to adapt its surface to the tilt surface datum of any stereoscopic pair of photographs which may be selected for plotting.

5. A combination, as claimed in claim 1, in which said tilt surface datum cam element comprises a mat flexible along the stereoscopic parallax and rigid at right angles thereto and adjustable supports on opposite edges of said mat.

6. A combination, as claimed in claim 1, in which said tilt surface datum cam element comprises two parallel groups of standards, a mat flexible along the stereoscopic parallax and rigid at right angles thereto disposed between said standards with two opposite edges thereof adjacent said two groups of standards, respectively, and, on each standard, a member adjustable lengthwise of said standard and including means to grip the adjacent edge of said mat.

7. A combination, as claimed in claim 1, in which said tilt surface datum cam element comprises two parallel groups of hollow standards, a mat flexible along the stereoscopic parallax and rigid at right angles thereto disposed between said standards, with two opposite edges thereof adjacent said two groups of standards, respectively, a threaded spindle in each standard, a nut on each spindle having a portion projecting outwardly through an elongated slot in said hollow standard, means on the outwardly projecting portion of each nut to grip the adjacent edge of said mat, and means on the top of each standard for rotating the spindle therein so as to raise or lower the corresponding nut.

8. A combination, as claimed in claim 1, in which said tilt surface datum cam element comprises a mat including a plurality of rods of equal length disposed adjacent one another in parallel relationship and flexible means extending transversely of and connecting said rods, and adjustable supports for the edges of said mat formed by the ends of said rods.

9. A combination, as claimed in claim 1, in which said tilt surface datum cam element comprises a mat including a plurality of rods of equal length disposed adjacent one another in parallel relationship and pairs of flexible metal strips, extending above and below said rods transversely of the latter at their opposite ends, and adjustable supports for said pairs of metal strips.

10. A combination, as claimed in claim 1, in which said lever is pivoted directly to said carriage and said means for displacing said element and measuring device operate in direct proportion to the pivotal movements of said lever.

11. A combination, as claimed in claim 1, including a slide mounted on said carriage for displacement relative thereto along the stereoscopic parallax, said displaceable element having rigidly united therewith a second movable marker and being supported on said slide and displaceable relative thereto along said parallax, said measuring device being fixedly mounted on said slide and including means to measure the displacement of said displaceable element relative to said slide and said means for displacing said element and measuring device operating on said slide so as to effect a displacement of said second movable marker relative to said first marker.

12. A combination, as claimed in claim 1, in which said lever includes an element swingable about a fulcrum and carrying at one point thereof said follower while controlling at a second point spaced from said first point the displacements of said displaceable element and measuring device, the imaginary lines connecting said fulcrum, respectively, to said two points being disposed at substantially right angles to one another and the ratio of the distances from said fulcrum to said first point and to second point, respectively, being proportional to the scale of enlargement of the tilt surface datum curve on said cam element.

13. In combination with a stereoscopic altitude plotting instrument for pairs of aerial photographs, said instrument including a carriage provided with a marker and displaceable along the stereoscopic parallax and at right angles thereto to determine on one photograph of a selected stereoscopic pair the point to be plotted, an element displaceable relative to said determined point along the stereoscopic parallax for altitude plotting purposes, and a measuring device for measuring the displacement of said element to permit plotting of the altitude at the selected point, an altimetric-stereo-corrector comprising a first cam element having an adjustable cam surface curved and inclined in function of the curvatures and inclinations of the tilt surface datum for the stereoscopic pair of photographs to be plotted, a second cam element having a cam surface curved in function of the curvature of the optical distortion surface datum of the camera used in making the photographs to be plotted, a first lever pivoted directly to said carriage, an auxiliary slide member on said carriage shiftable relative thereto along the stereoscopic parallax, means on said first lever to displace said slide member relative to said carriage in function of the pivotal movements carried out by said first lever, a second lever pivoted to said auxiliary slide member, one of said levers having a follower in contact with the cam surface corresponding to the tilt surface datum for displacement over said cam surface in function of the displacement of said carriage along the stereoscopic parallax, the other lever having a follower in contact with the cam surface corresponding to the optical distortion surface datum for displacement over this cam surface in function of the displacement of said carriage along said stereoscopic parallax, and means on said lever pivoted to said auxiliary slide member to displace said element and measuring device in unison in function of the resultant obtained from the pivotal movements of both said levers.

14. A combination, as claimed in claim 13, in which said tilt surface datum cam element comprises two parallel groups of standards, a mat flexible along the stereoscopic parallax and rigid at right angles thereto disposed between said standards with two opposite edges thereof adjacent said two groups of standards, respectively; and, on each standard, a member adjustable lengthwise thereof and including means to grip the adjacent edge of said mat, and said optical distortion surface cam element is a permanently shaped cam plate mounted in inverted position on top of said standards.

15. A combination, as claimed in claim 13, in which said first lever has its follower moving in contact with the cam surface corresponding to the optical distortion surface datum.

16. A combination, as claimed in claim 13, in which the lever, the follower of which moves in contact with the cam face corresponding to the optical distortion surface datum, includes an adjustable element to permit of changing the ratio at which pivotal movements of said lever are transmitted to the displaceable element and measuring device.

BENJAMIN ARCOVERDE DE
ALBUQUERQUE CAVALCANTI.